US009538520B2

United States Patent
Zhou

(10) Patent No.: US 9,538,520 B2
(45) Date of Patent: *Jan. 3, 2017

(54) DATA TRANSMISSION METHOD, NETWORK SYSTEM AND CORRESPONDING DEVICE

(71) Applicant: HUAWEI TECHNOLOGIES CO., LTD., Shenzhen, Guangdong (CN)

(72) Inventor: Zhaojie Zhou, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,090

(22) Filed: Aug. 12, 2015

(65) Prior Publication Data

US 2016/0037495 A1 Feb. 4, 2016

Related U.S. Application Data

(63) Continuation of application No. 13/921,197, filed on Jun. 18, 2013, now Pat. No. 9,125,210, which is a
(Continued)

(30) Foreign Application Priority Data

Jun. 27, 2008 (CN) .......................... 2008 1 0029102

(51) Int. Cl.
*H04W 72/04* (2009.01)
*H04W 8/24* (2009.01)
(Continued)

(52) U.S. Cl.
CPC ............. *H04W 72/042* (2013.01); *H04W 8/24* (2013.01); *H04W 72/048* (2013.01); *H04W 76/046* (2013.01); *H04W 88/02* (2013.01)

(58) Field of Classification Search
CPC .... H04W 72/042; H04W 8/24; H04W 72/048; H04W 88/02
See application file for complete search history.

(56) References Cited

U.S. PATENT DOCUMENTS 7,283,508 B2 10/2007 Choi et al.
7,372,842 B2 5/2008 Kim et al.
(Continued)

FOREIGN PATENT DOCUMENTS

CN 1571355 A 1/2005
CN 101022299 A 8/2007
(Continued)

OTHER PUBLICATIONS

3GPP TSG-RAN WG2 #60 R2-075297,"Consideration on Iur problem on Enhanced Fach", Nokia Siemens Networks, Nov. 5-9, 2007,total 32 pages.
(Continued)

*Primary Examiner* — Melvin Marcelo
(74) *Attorney, Agent, or Firm* — Huawei Technologies Co., Ltd

(57) ABSTRACT

A data transmission method in an enhanced CELL_FACH state, a network system, and a corresponding device are provided. The method includes the following steps. A radio transceiver receives information indicating a capability category of a UE. The radio transceiver acquires the capability category of the UE according to the information indicating the capability category of the UE. The radio transceiver performs data transmission to or from the UE according to the capability category of the UE. Since the information indicating the capability category of the UE is sent to the radio transceiver during the enhanced CELL_FACH data transmission, the radio transceiver performs the data transmission based on the capability category of a target UE, instead of the lowest capability category of the UE, thereby
(Continued)

increasing the data transmission rate in the enhanced CELL_FACH state.

17 Claims, 3 Drawing Sheets

Related U.S. Application Data continuation of application No. 12/969,605, filed on Dec. 16, 2010, now Pat. No. 8,488,542, which is a continuation of application No. PCT/CN2009/072304, filed on Jun. 16, 2009.

(51) Int. Cl.
*H04W 76/04* (2009.01)
*H04W 88/02* (2009.01)

(56) References Cited

U.S. PATENT DOCUMENTS

| | | | |
|---|---|---|---|
| 7,848,279 | B2 | 12/2010 | Ranta-aho et al. |
| 9,125,210 | B2* | 9/2015 | Zhou ............... H04W 76/046 |
| 2005/0026597 | A1 | 2/2005 | Kim et al. |
| 2005/0265220 | A1 | 12/2005 | Erlich et al. |
| 2007/0189236 | A1 | 8/2007 | Ranta-aho et al. |
| 2007/0258402 | A1 | 11/2007 | Nakamata et al. |
| 2008/0123585 | A1 | 5/2008 | Granzow et al. |
| 2009/0052376 | A1 | 2/2009 | Cave et al. |
| 2009/0163199 | A1 | 6/2009 | Kazmi et al. |
| 2010/0215005 | A1 | 8/2010 | Pradas et al. |
| 2011/0081928 | A1 | 4/2011 | Chen et al. |
| 2011/0086656 | A1 | 4/2011 | Zhou |
| 2011/0092229 | A1 | 4/2011 | Chang et al. |
| 2011/0194522 | A1 | 8/2011 | Zhou |

FOREIGN PATENT DOCUMENTS

| | | |
|---|---|---|
| CN | 101079666 A | 11/2007 |
| CN | 101616493 A | 12/2009 |
| EP | 1928132 A2 | 6/2008 |
| WO | 2009155833 A1 | 12/2009 |

OTHER PUBLICATIONS

3GPP TSG-RAN WG3 Meeting #59 R3-080443,"Introduction of an additional UE Category for 1.28Mcps TDD E-DCH", Change Request 25.433 CR 1453 V7.7.0,Catt et al., Feb. 11-15, 2008,total 26 pages.

3GPP TSG RAN WG3 Meeting #61 R3-081938,"Improve the data rate for Enhanced Cell_FACH state in FDD", Huawei, Aug. 18-22, 2008,total 2 pages.

3GPP TSG-RAN WG3 Meeting #61 R3-082020,"Improve the data rate for Enhanced Cell_FACH state in FDD", Change Request 25.435 CR 185 V7.8.0, Huawei, Aug. 18-22, 2008,total 6 pages.

3GPP TSG-RAN4 Meeting #45 R4-072219,"Introduction of requirements for UE capable of receiving HS-DSCH and HS-SCCH in CELL_FACH state", Change Request 25.101 CR 579 V 7.9.0, Ericsson et al., Nov. 5-9, 2007, total 14 pages.

3GPP TS 25.435 V7.8.0, 3rd Generation Partnership Project;Technical Specification Group Radio Access Network; UTRAN Iub interface User Plane Protocols for Common Transport Channel data streams(Release 7), Mar. 2008, total 52 pages.

3GPP TSG-RAN WG3 Meeting #53 R3-061305,"Modifying HS-DSCH Physical Layer Category Info in Synchronised/Unsynchronised Radio Link Reconfiguration Procedure",Change Request 25.433 CR 1262 V7.1.0, ZTE et al., Aug. 28-Sep. 1, 2006,total 12 pages.

Troels Emil Kolding et al., "High Speed Downlink Packet Access: WCDMA Evolution",IEEE Vehicular Technology Society News • Feb. 2003, total 7 pages.

3GPP TS 25.306 V5.2.0,3rd Generation Partnership Project;Technical Specification Group Radio Access Network;UE Radio Access capabilities(Release 5),Sep. 2002,total 27 pages.

3GPP TS 25.306 V8.3.0,3rd Generation Partnership Project;Technical Specification Group Radio Access Network;UE Radio Access capabilities(Release 8),May 2008,total 49 pages.

3GPP TS 25.321 V8.2.0,3rd Generation Partnership Project;Technical Specification Group Radio Access Network; Medium Access Control (MAC) protocol specification(Release 8),May 2008,total 156 pages.

3GPP TR 25.858 V5.0.0,3rd Generation Partnership Project;Technical Specification Group Radio Access Network; High Speed Downlink Packet Access: Physical Layer Aspects(Release 5),Mar. 2002,total 31 pages.

3GPP TSG-RAN WG2 Meeting #57 R2-070812, "Stage 2 updates for Enhanced CELL_PCH and URA_PCH state in FDD", Ericsson, Change Request 25.308 CR CRNum, V7.1.0, Feb. 12-16, 2007, total 36 pages.

3GPP TSG-RAN WG3 Meeting #55 R3-070278, "Solution on Iur Problem with pre-Rel7 SRNC", Nokia, Feb. 12-16, 2007, total 4 pages.

\* cited by examiner

DATA TRANSMISSION METHOD, NETWORK SYSTEM AND CORRESPONDING DEVICE

CROSS REFERENCE TO RELATED APPLICATIONS

This application is a continuation of U.S. patent application Ser. No. 13/921,197, filed on Jun. 18, 2013, which is a continuation of U.S. patent application Ser. No. 12/969,605, now U.S. Pat. No. 8,488,542, filed on Dec. 16, 2010. U.S. patent application Ser. No. 12/969,605 is a continuation of International Application No. PCT/CN2009/072304, filed on Jun. 16, 2009. The International Application claims priority to Chinese Patent Application No. 200810029102.0, filed on Jun. 27, 2008. The afore-mentioned patent applications are hereby incorporated by reference in their entireties.

FIELD OF THE TECHNOLOGY

The present invention relates to the field of mobile communication, and more particularly to a data transmission method, a network system, and a corresponding device.

BACKGROUND OF THE INVENTION

In a third generation (3G) radio network, a user equipment (UE) has two modes of operation, an idle mode and a connected mode. The connected mode is further classified into four states: (1) cell dedicated channel (CELL_DCH) state, (2) cell forward access channel (CELL_FACH) state, (3) cell paging channel (CELL_PCH) state, and (4) UTRAN registration area paging channel (URA_PCH) state (in which UTRAN stands for universal mobile telecommunications system terrestrial radio access network). A basic characteristic of the CELL_FACH state is that no dedicated physical channel connection is provided between the UE and the radio access network. The UE, in a downlink direction, continuously monitors transmission in a forward access channel (FACH) and, in an uplink direction, uses a common or shared transmission channel such as the random access channel (RACH). Thus, the UE can initiate an access process on an associated transmission channel at any time.

Enhanced CELL_FACH is a newly introduced technique in the Third Generation Partnership Project (3GPP) R7 standards. It is based on the CELL_FACH technique.

In the enhanced CELL_FACH, the downlink data borne on an FACH transmission channel can be handed over to a high speed downlink shared channel (HS-DSCH), so as to increase the data transmission rate in the CELL_FACH state and reduce the delay in a state transition.

As can be seen from the technical features of the R7 standardized enhanced CELL_FACH, in the enhanced CELL_FACH state, downlink user data is allowed to be transmitted to a UE in the CELL_FACH state through the HS-DSCH, the UE thus shares the downlink resources with other UEs in the CELL_DCH state, so that the UE in the CELL_FACH state may also enjoy high speed downlink data transmission just like the other UEs in the CELL_DCH state.

In the non-enhanced CELL_FACH state, the data transmission rate is generally lower than 32 Kbps. Downlink high speed data transmission cannot be realized until the state of the UE is transited to the CELL_DCH state. In contrast, in the enhanced CELL_FACH state, the downlink high speed data transmission can be realized without transiting the state of the UE to the CELL_DCH state. Therefore, the time required for the state transition from the original CELL_FACH state to the CELL_DCH state for realizing the high speed data transmission is greatly reduced, and the data transmission rate is increased.

However, in the process of making the present invention, the inventor found that, in the current enhanced CELL_FACH state, a radio transceiver in the network, e.g. a radio base station (Node B) or an Evolution Node B (E-Node B), may not know the capability category of a UE in the current cell that implements the enhanced CELL_FACH reception. Thus, when the radio transceiver performs a transport format resource combination (TFRC) on enhanced CELL_FACH data queues using a scheduling algorithm, the operation has to be based on the lowest capability category of the UE, thereby resulting in limitations of the data transmission rate.

SUMMARY OF THE INVENTION

Accordingly, the present invention is directed to a data transmission method in an enhanced CELL_FACH state, a corresponding network system, and a corresponding device. The invention can enable a radio transceiver to perform data transmission in the enhanced CELL_FACH state based on the capability category of a target UE.

Embodiments of the present invention provide a network system, which includes a radio transceiver and a control apparatus.

The control apparatus is configured to send information indicating the capability category of a UE to the radio transceiver.

The radio transceiver comprises a receiver and a transmitter, wherein the receiver is configured to receive the information indicating the capability category of the UE from the control apparatus, and the transmitter is configured to perform data transmission in an enhanced cell forward access channel state according to the capability category of the UE.

In the embodiments of the present invention, the radio transceiver receives the information indicating the capability category of the UE, and acquires the capability category of the UE. During the enhanced CELL_FACH data transmission, the radio transceiver performs data transmission based on the capability category of the UE, instead of the lowest capability category of the UE, and thus the data transmission rate in the enhanced CELL_FACH state is increased.

DETAILED DESCRIPTION OF THE EMBODIMENTS

Figure 1:
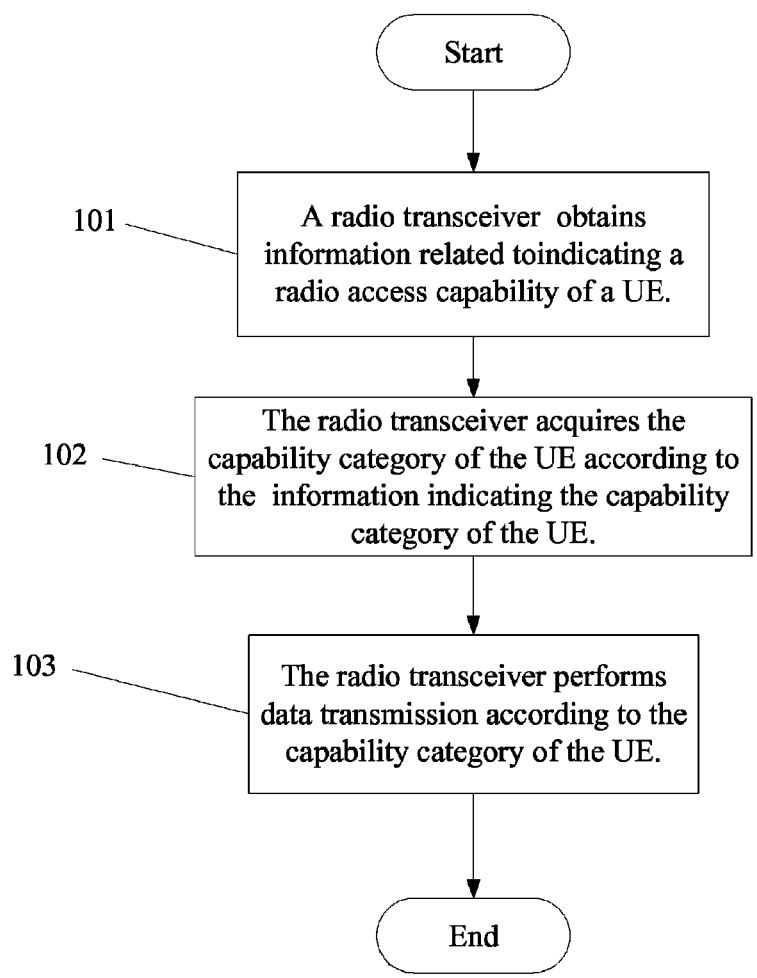
FIG. 1 is a flow chart of a data transmission method in an enhanced CELL_FACH state according to an embodiment of the present invention.

Currently, the enhanced CELL_FACH technique defined by the 3GPP R7 standard protocol is implemented in the following process:

1. A UE supporting the enhanced CELL_FACH monitors a "HS-DSCH common system information" IE carried in a System Information Block type 5 and 5bis message broadcasted in a cell, and configures basic parameters required by the enhanced CELL_FACH. The basic parameters include a Common H-RNTI and a BCCH specific H-RNTI.

(Here IE is the abbreviation for information element, RNTI is the abbreviation for radio network temporary identifier, H-RNTI is the abbreviation for HS-DSCH-RNTI, and BCCH is the abbreviation for broadcast control channel.)

2. The UE informs a radio network controller (RNC) that it supports the enhanced CELL_FACH through a "support of HS-PDSCH in CELL_FACH" IE and a "support of MAC-ehs" IE carried in a RRC Connection Request message.

(Here HS-PDSCH is the abbreviation of high speed physical downlink shared channel, RRC is the abbreviation for radio resource control, and MAC is the abbreviation for media access control.)

3. If the RNC knows that the cell where the UE currently resides also supports the enhanced CELL_FACH, the RNC may indicate that the UE is in the CELL_FACH state and configure other related parameters of HS-DSCH reception in an RRC Connection Setup message, wherein the related parameters include a dedicated H-RNTI.

4. The UE returns a RRC Connection Setup Complete message, and the message may carry an HS-DSCH physical layer category of the UE. At this time, the UE is in a state of monitoring a high speed physical downlink shared control channel (HS-SCCH).

5. When a message signaling or data needs to be transmitted via the BCCH, common control channel (CCCH), dedicated control channel (DCCH), or dedicated traffic channel (DTCH), the RNC transmits the signaling or data to a Node B in an HS-DSCH data frame (for example, an HS-DSCH DATA FRAME TYPE2 data frame) through an Iub interface (that is, an interface between the RNC and the Node B). The data frame, meanwhile, carries a corresponding H-RNTI.

6. When scheduling the data according to a queue priority, the Node B performs different TFRC selection processes according to the category of the H-RNTI carried in the HS-DSCH data frame (referring to as an FP frame hereinafter). There may be the following two circumstances:

A. When the Node B schedules the data according to a queue priority, if the H-RNTI carried in a FP frame is a BCCH specific H-RNTI, the data in the frame is a BCCH message signaling. Accordingly, the Node B performs signaling data transmission according to power of the HS-SCCH, power of the HS-PDSCH and a fixed number of channelization codes, all of which are configured at an upper layer, and ignores an RACH Measurement Result IE. Meanwhile, the H-RNTI for HS-SCCH encryption is the BCCH specific H-RNTI.

B. When the Node B schedules the data according to the queue priority, if the H-RNTI carried in the FP frame is not a BCCH specific H-RNTI, the data in the frame is CCCH, DCCH, or DTCH signaling or data. Accordingly, the Node B performs the TFRC selection according to an HS-DSCH physical layer category-Category 12 and a RACH Measurement Result IE (normally an Ec/NO of a CPICH) in the FP frame containing the data, and performs the HS-SCCH encryption using the H-RNTI in the FP frame.

(Here, CPICH is the abbreviation for common pilot channel, and the Ec/NO refers to chip-level signal-to-noise ratio.)

7. If the UE has already been allocated with the dedicated H-RNTI, the UE monitors the HS-SCCH channel using both the dedicated H-RNTI and the BCCH specific H-RNTI, and if the reception is correct, the UE starts receiving HS-PDSCH data according to information carried in the HS-SCCH.

8. If the UE is not allocated with the dedicated H-RNTI, the UE monitors the HS-SCCH using both the Common H-RNTI and the BCCH specific H-RNTI, and if the reception is correct, the UE starts receiving HS-PDSCH data according to information carried in the HS-SCCH.

As can be seen from the above description, in the above circumstance B, since the Node B does not know the capability category of the UE in the current cell that implements the enhanced CELL_FACH reception, the Node B can only perform the TFRC selection based on the lowest capability category of the UE (for example, the lowest HS-DSCH physical layer category-Category 12).

It should be noted that, taking a Universal Mobile Telecommunication System (UMTS) for example, categories of UE radio access capability include a HS-DSCH physical layer capability category and an enhanced dedicated channel (E-DCH) physical layer capability category. A UE capability category corresponds to a series of parameters of Packet Data Convergence Protocol (PDCP), radio link control (RLC), MAC, and physical layer (PHY), etc. The HS-DSCH physical layer capability category defines the UE supporting the HSDPA in the UMTS. This category corresponds to a series of parameters including a supported maximum number of channelization codes, a receiving capability in the minimum continuous transmission time intervals (TTIs), and a bit number of data for the largest HS-DSCH transmission block in a single TTI, supported modulation modes, and Multiple-Input Multiple-Output (MIMO), etc. These parameters are adopted by the Node B for references in the HSDPA scheduling.

In a flat architecture of the 3GPP Long Term Evolution (LTE), an E-Node B is adopted to replace the original RNC and the Node B. A corresponding component of the E-Node B (for example, a functional unit corresponding to the original Node B) may not know the capability category of the UE in the enhanced CELL_FACH state, so that a similar problem also exists therein.

In view of the above, in an embodiment of the present invention, a data transmission method in the enhanced CELL_FACH state is provided, as shown in FIG. 1. The method includes the following.

101, a radio transceiver receives information indicating a capability category of a UE from a radio network controller.

The radio transceiver may be a Node B or a corresponding device in an E-Node B in the flat architecture (that is, a functional component in E-Node B that corresponds to the original Node B).

The capability category of the UE may be a physical layer category of the UE, for example, a HS-DSCH physical layer category or an E-DCH physical layer category. The information indicating the capability category of the UE may be a data frame or a signaling, for example, an HS-DSCH data frame indicating the capability category of the UE, a signaling containing the capability category of the UE, or a signaling containing an indication of the capability category of the UE. The signaling containing the indication of the capability of the UE may be, for example, a signaling that instructs the radio transceiver to store the capability category of the UE when the UE is transited from the CELL_DCH state to the CELL_FACH state.

The radio transceiver acquires the capability category of the UE explicitly or implicitly depending upon the different information indicating the capability category of the UE it received. The explicit information is the information that directly contains the capability category of the UE. For example, a HS-DSCH data frame or signaling (such as a Node B Application Part (NBAP) signaling) contains the capability category of the UE. The implicit information is the information that does not directly contain the capability category of the UE, but indirectly enables the radio transceiver to acquire the capability category of the UE.

When a RNC entity and a Node B entity are integrated into the E-Node B, the radio transceiver is a functional component of the E-Node B. However, the internal mechanism of the E-Node B still works according to specific functionalities of the RNC and the Node B.

102, the radio transceiver acquires the capability category of the UE according to the information indicating the capability category of the UE.

The radio transceiver acquires the capability category of the UE in different manners depending upon the different information indicating the capability category of the UE.

When the information is explicit, the radio transceiver directly resolves the information, so as to acquire the capability category of the UE.

When the information is implicit, i.e. the information does not directly contain the capability category of the UE, but indirectly enables the radio transceiver to acquire the capability category of the UE. For example, if the radio transceiver is the Node B, and, for example, when the UE is about to perform a RRC connection state transition, the RNC initiates an NBAP signaling of transiting the UE from a CELL_DCH state to a CELL_FACH state. As the Node B has already stored the capability category of the UE locally, when the UE is in the CELL_DCH state, the related NBAP signaling (for example, Radio Link Deletion Request signaling) sent by the RNC to the Node B instructs the Node B to store (not delete) the capability category of the UE. Thus, in the enhanced CELL_FACH state, the Node B performs data transmission according to the stored capability category of the UE. In this case, the NBAP signaling implicitly indicates the capability category of the corresponding UE in the Node B. The radio transceiver acquires the capability category of the UE from the locally stored information.

103, the radio transceiver performs data transmission according to the capability category of the UE.

Specifically, the radio transceiver may perform the TFRC selection according to the capability category of the UE, so as to transmit the data accordingly.

Various modes of information indicating the capability category of the UE are described in the following.

Mode 1: Using an HS-DSCH data frame (for example, an HS-DSCH DATA FRAME TYPE2 data frame) to carry an indicator of an HS-DSCH physical layer category of a UE (such as a mobile station (MS)).

For ease of understanding, the format of the HS-DSCH DATA FRAME TYPE2 data frame according an embodiment of the present invention is taken as an example below, and compared with the format of the HS-DSCH DATA FRAME TYPE2 data frame defined in the prior 3GPP R7 protocol in the following illustration.

Figure 2:
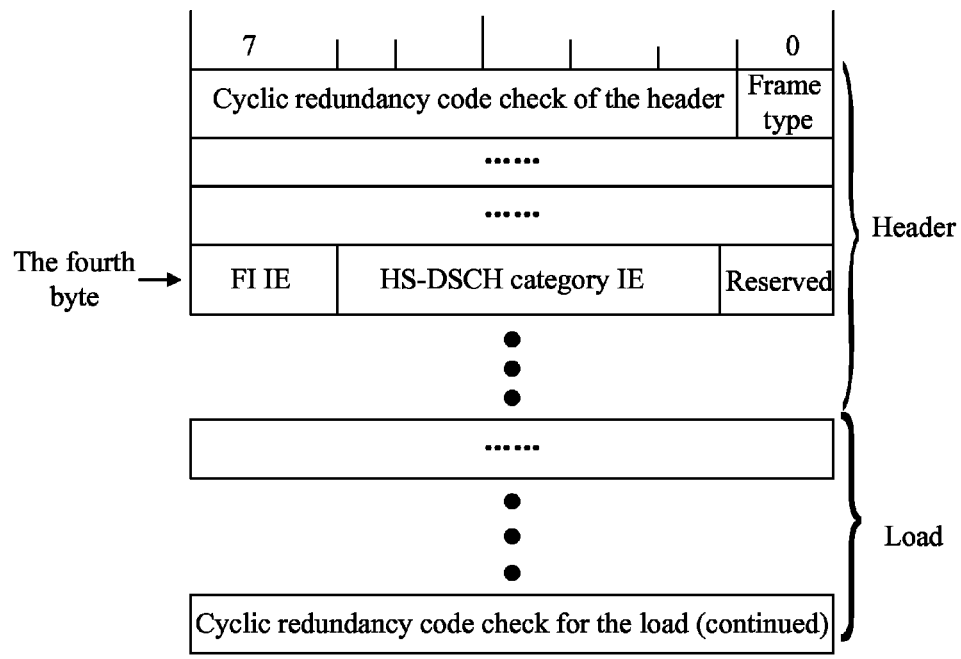
FIG. 2 is a schematic view of an HS-DSCH DATA FRAME TYPE2 data frame according to an embodiment of the present invention.

FIG. 2 shows an example of the format of the HS-DSCH DATA FRAME TYPE2 data frame according to an embodiment of the present invention. For the convenience of description, the "HS-DSCH DATA FRAME TYPE2 data frame" is referred to as "FP frame" below. The difference between the FP frame of the prior R7 protocol and the FP frame according to the embodiment of the present invention lies in the definition of a fourth byte of the FP frame, which is illustrated in the following.

The fourth byte of the FP frame in the prior R7 protocol includes two parts, an FACH Indicator (FI) IE and a Spare; whereas in the embodiment of the present invention, the fourth byte of the FP frame includes three parts, an FI IE, an HS-DSCH category IE, and a Spare. Meanwhile, the definitions of the FI IE and bit lengths of the two FP frames are also different, as listed in the following Table 1:

TABLE 1

| | Definition | Bit Width (Bit) | Value Range |
|---|---|---|---|
| FI IE of the FP frame in the prior R7 protocol | The FI indicates whether the UE is in the CELL_FACH state, and whether an H-RNTI and an RACH Measurement Result are provided. | 1 | 1 represents that the H-RNTI and the RACH Measurement Result are provided; and 0 represents that the two are not provided. |
| FI IE of the FP frame in the embodiment of the present invention | The FI indicates whether the UE is in the CELL_FACH state, and whether an H-RNTI, an RACH Measurement Result, and an HS-DSCH physical layer category of the UE are provided. | 2 | 11 represents that the H-RNTI, the RACH Measurement Result, and the HS-DSCH physical layer category of the UE are provided; 10 represents that the H-RNTI and the RACH Measurement Result are provided, whereas the HS-DSCH physical layer category of the UE is not provided; and 00 represents that none of the above are provided. |

In the embodiment of the present invention, a new HS-DSCH category IE is defined in the FP frame. The new IE is utilized to indicate the HS-DSCH physical layer category of a target UE. The HS-DSCH category IE has 4 bits. When the FI IE is "11", the HS-DSCH category IE is filled with bits corresponding to the HS-DSCH physical layer category defined in the 3GPP R7 25.306 protocol, and at this time, the corresponding relation there-between is shown in the following Table 2; otherwise, the HS-DSCH category IE is filled with "0000", which is equal to the Spare.

TABLE 2

| HS-DSCH category IE of the FP frame in the embodiment of the present invention | HS-DSCH physical layer category defined in 25.306 |
|---|---|
| 0000 | N/A |
| 0001 | Category 5 |
| 0010 | Category 6 |
| 0011 | Category 7 |
| 0100 | Category 8 |
| 0101 | Category 9 |
| 0110 | Category 10 |
| 0111 | Category 12 |
| 1000 | Category 13 |
| 1001 | Category 14 |
| 1010 | Category 15 |
| 1011 | Category 16 |
| 1100 | Category 17 |
| 1101 | Category 18 |
| 1110 | Category 19 |
| 1111 | Category 20 |

The Spare in the fourth byte of the FP frame defined in the embodiment of the present invention has 2 bits left, which may be filled with "00", and the 2 bits may also be used as extension spare bit positions for the HS-DSCH physical layer category of a subsequent UE.

It should be noted that, the definitions in the above two tables are only exemplary, instead of limiting the scope of the present invention. For example, the relation between the HS-DSCH physical layer category defined in the 25.306 protocol and the HS-DSCH category IE of the FP frame in the embodiment of the present invention may not follow the specifications as defined in Table 2, and have other variations, which will not be described herein, these and similar variations are easily derived by persons of ordinary skills in the art.

Therefore, in this embodiment, in the enhanced CELL_FACH state, after obtaining the HS-DSCH DATA FRAME TYPE2 data frame containing the HS-DSCH physical layer category of the UE, the Node B resolves the data frame to obtain the capability category of the UE (that is, the HS-DSCH physical layer category), performs data scheduling according to an enhanced CELL_FACH data transmission mode as defined in the 3GPP R7 standard protocol, and transmits data in corresponding channels.

Mode 2: The capability category of the UE is explicitly or implicitly contained in a signaling. Specifically, the signaling may be an NBAP signaling.

1) In the explicit case, the radio transceiver obtains an NBAP signaling containing a physical layer category of the UE, resolves the signaling to obtain a capability category of the UE, performs data scheduling according to an enhanced CELL_FACH data transmission mode as defined in the 3GPP R7 standard protocol, and transmits data in the corresponding channels.

2) An implicit instance generally occurs in the case of a connection state transition. For example, when the UE is transited from a CELL_DCH state to a CELL_FACH state, the RNC sends a NBAP signaling containing a Radio Link Deletion Request to the Node B. The signaling is originally intended to delete the original radio link parameter information (i.e. the radio link parameter information in the CELL_DCH state) of the UE, so as to re-configure the radio link parameter information in the CELL_FACH state on the Node B. However, in the CELL_DCH state, the radio link parameter information stored in the Node B contains the physical layer category of the UE, so in the embodiment of the present invention, when the UE is transited from the CELL_DCH state to the CELL_FACH state, the NBAP signaling sent from the RNC to the Node B instructs the Node B to store the physical layer category of the UE, so as to enable the Node B to acquire the capability category of the UE in the enhanced CELL_FACH state. Besides, the NBAP signaling may even include other HS-DSCH parameter configurations in the original CELL_DCH state, so as to support the UE in the CELL_FACH state to obtain a higher HS-DSCH transmission rate as much as possible. A specific example of the NBAP signaling is given below for further illustration.

Taking the Radio Link Deletion Request signaling in the NBAP signaling for example, when the UE is transited from the CELL_DCH state to the CELL_FACH state, the RNC sends the Radio Link Deletion Request signaling to the Node B, so as to delete related radio link parameters in the CELL_DCH state.

In this embodiment, in order to enable the Node B to acquire the capability category of the UE, an RRC State Transition Indicator is added to the Radio Link Deletion Request signaling. The RRC State Transition Indicator is defined in Table 3 as follows:

TABLE 3

| IE/Group Name | Presence | Range | IE Type and Reference | Semantics Description | Criticality | Assigned Criticality |
|---|---|---|---|---|---|---|
| RRC State Transition Information | | | | | | — |
| > RRC State Transition Indicator | O | | Enumerated (CELL_FACH) | | | |
| >HS-DSCH-RNTI | O | | INTEGER (0..65535) | | | |

In Table 3, an RRC state that the UE corresponding to the radio link deleted by the RRC State Transition Indicator IE is about to enter includes an Idle state and a CELL_FACH state, and the RRC State Transition Indicator IE is extensible.

The HS-DSCH-RNTI IE instructs the RNC to assign a new H-RNTI to the UE corresponding to the deleted radio link.

After the Node B receives the RRC State Transition Information IE, if the RRC State Transition Indicator IE indicates the CELL_FACH, and the RNC assigns a new H-RNTI to the UE, the RRC State Transition Indicator IE contains an HS-DSCH-RNTI IE, so that the H-RNTI stored in the Node B is consistent with the H-RNTI stored in the UE, and the Node B stores a corresponding relation between the HS-DSCH physical layer category and the H-RNTI of the UE corresponding to the radio link. The RRC State Transition Indicator IE may even include other HS-DSCH parameter configurations in the original CELL_DCH state. These parameters may include whether to support 64 Quadrature Amplitude Modulation (64 QAM) mode and parameters in the mode, multiple-input multiple-output (MIMO) mode and parameters in the mode, CQI (Channel Quality Indicator) finally reported by the UE, and the like, so that the Node B may perform the TFRC selection based on the corresponding capability category of the UE and the above HS-DSCH parameters, so as to perform data transmission accordingly.

It should be noted that, the Node B may store a part of or all of the other HS-DSCH parameters in the original CELL_DCH state, only store the physical layer category information, or store all the information.

If the Node B stores the physical layer category information of the UE in the link deletion according to the NBAP signaling, it is equivalent to implicitly sending an indicator of the capability category of the UE, by the RNC, to the Node B through the NBAP signaling.

In the circumstance that the RNC entity and the Node B entity are integrated into the E-Node B, the radio transceiver is a component in the E-Node B. The data frame, NBAP signaling, and the like transmitted between the RNC and the Node B are all internal transmission signals in the E-Node B. Thus, according to specific designs of the manufacturers, the data frame or NBAP signaling may be adopted to transmit the physical layer category information of the UE between the RNC entity and the Node B entity inside the E-Node B, or a data transmission format defined in the E-Node B may be adopted to transmit the physical layer category information of the UE between the RNC entity and the Node B entity.

As described above, in the data transmission method in the enhanced CELL_FACH state according to the embodiment of the present invention, since the indication of the capability category of the UE is explicitly or implicitly sent to the Node B, when the UE is set to receive enhanced CELL_FACH data in the CELL_FACH state, the Node B performs TFRC selection on the CCCH, DCCH, and DTCH data queues from the RNC based on the HS-DSCH physical layer category of the target UE, instead of the lowest physical layer category (for example, Category 12), thereby the data transmission rate in the enhanced CELL_FACH state is increased. In the technical solution of the embodiment of the flat architecture, a similar technical effect can be achieved by using the corresponding technical solution, which will not be described herein again.

Figure 3:
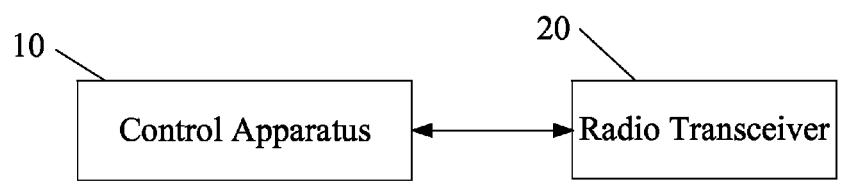
FIG. 3 is a block diagram of a network system according to an embodiment of the present invention.

Accordingly, as shown in FIG. 3, in an embodiment of the present invention, a network system is provided, and the system is capable of operating in an enhanced CELL_FACH state. The system includes a control apparatus 10 and a radio transceiver 20. Specifically, the radio transceiver 20 may be a Node B, and the control apparatus 10 may be an RNC. Alternatively, in the flat architecture, the radio transceiver 20 may be a component in an E-Node B that corresponds to the Node B (for example, a transceiver unit), and the control apparatus 10 may be a component in the E-Node B that corresponds to the RNC (for example, a control unit).

The control apparatus 10 is configured to send information indicating a capability category of a UE to the radio transceiver 20, so as to instruct the radio transceiver to perform data transmission in an enhanced CELL_FACH state according to a capability category of the UE. The capability category of the UE includes a HS-DSCH physical layer category or an E-DCH physical layer category.

The information indicating the capability category of the UE may include one or more of the following:

a. an HS-DSCH data frame containing the capability category of the UE;

b. a first signaling containing the capability category of the UE; and c. a second signaling indicating the capability category of the UE, wherein the signaling includes an indicator instructing the radio transceiver to store the capability category of the UE when the UE is transited from a CELL_DCH state to a CELL_FACH state.

The format of the HS-DSCH data frame may take the format of the FP frame in the embodiment of the present invention as shown in FIG. 2. That is, the fourth byte of the FP frame contains both the FI IE and the HS-DSCH category IE to jointly indicate the capability category of the UE.

The FI IE indicates whether the UE is in the CELL_FACH state, and whether the H-RNTI, RACH Measurement Result, and HS-DSCH physical layer category of the UE are provided, which can be seen in Table 1.

The HS-DSCH category IE indicates the HS-DSCH physical layer category of the target UE of the data frame, that is, the capability category of the UE. Specifically, when the FI IE indicates that the HS-DSCH physical layer category of the UE is provided, the HS-DSCH category IE may provide the specific capability category of the UE according to the HS-DSCH physical layer category defined in the 3GPP R7 25.306 protocol; and when the FI IE indicates that the HS-DSCH physical layer category of the UE is not provided, the HS-DSCH category IE is filled with 0 byte, as shown in Table 2.

The above description on the format of the HS-DSCH data frame is only exemplary, and the HS-DSCH data frame of the present invention may have other formats. For example, the capability category of the UE may be contained in other bytes of the data frame, and the indicator of the capability category of the UE may be realized in other forms, which is not necessarily 6 bytes in total, and is not described herein again.

The above first signaling may be an NBAP signaling, and the specific NBAP signaling is adopted to notify the radio transceiver of the capability category of the related UE is apparent to persons of ordinary skill in the art, so that the details may not be given herein again.

The above second signaling may also be an NBAP signaling, which may be specifically an NBAP signaling containing a Radio Link Deletion Request that is sent from the RNC to the Node B during connection state transition, for example, when the UE is transited from the CELL_DCH state to the CELL_FACH state. An RRC State Transition Indicator of the UE in the current link deletion as shown in Table 3 is added in the signaling. The RRC State Transition Indicator of the UE carries two pieces of information:

1. RRC State Transition Indicator information, which indicates an RRC state that the corresponding UE is about to enter.

2. HS-DSCH-RNTI information, which is included when the RRC State Transition Indicator information, indicates that the UE is about to enter the CELL_FACH state, and the information instructs the RNC to assign a new H-RNTI to the corresponding UE.

After the Node B receives the RRC State Transition Indicator of the UE, if the RRC State Transition Indicator information indicates that the UE is about to enter the CELL_FACH state, the RRC State Transition Indicator IE further contains an HS-DSCH-RNTI IE, so that the H-RNTI stored in the Node B is consistent with the H-RNTI stored in the UE, and the Node B stores a corresponding relation between the HS-DSCH physical layer category and the H-RNTI of the UE corresponding to the radio link. The RRC State Transition Indicator IE may even include other HS-DSCH parameter configurations in the original CELL_DCH state.

As described above, when the RNC entity and the Node B entity are integrated into the E-Node B, the radio transceiver 20 is a component (for example, a transceiver unit) in the E-Node B that corresponds to Node B. The data frame, NBAP signaling, and the like transmitted between the RNC and the Node B are all internal transmission signals in the E-Node B. Thus, according to specific designs of the manufacturers, the data frame or NBAP signaling may be adopted to transmit the physical layer category information of the UE between the RNC entity and the Node B entity inside the E-Node B, or a data transmission format defined in the E-Node B may be adopted to transmit the physical layer category information of the UE between the RNC entity and the Node B entity.

Figure 4:
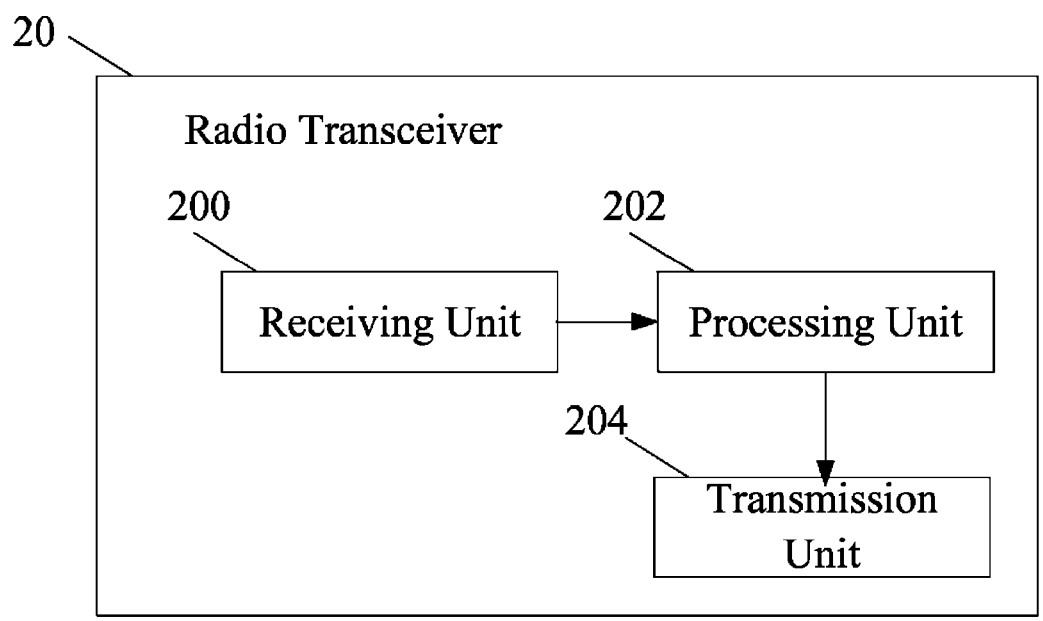
FIG. 4 is a block diagram of a radio transceiver according to an embodiment of the present invention.

Correspondingly, referring to FIG. 4, the radio transceiver 20 includes a receiving unit 200, a processing unit 202, and a transmitting unit 204. The receiving unit 200 is configured to receive information indicating capability category of a UE. The processing unit 202 is configured to acquire the capability category of the UE according to the information indicating the capability category of the UE received by the receiving unit 200. The transmitting unit 204 is configured to perform data transmission in an enhanced CELL_FACH state according to the capability category of the UE.

Correspondingly, the information indicating capability category of the UE includes one or more of the following:

a. an HS-DSCH data frame indicating the capability category of the UE, and correspondingly, the processing unit 202 is configured to resolve the HS-DSCH data frame to acquire the capability category of the UE;

b. a first signaling containing the capability category of the UE, and correspondingly, the processing unit 202 is configured to resolve the first signaling to acquire the capability category of the UE; and c. a second signaling including an indicator of notifying the radio transceiver 20 to store the capability category of the UE when the UE is transited from a CELL_DCH state to a CELL_FACH state. Correspondingly, the processing unit 202 is configured to resolve the second signaling, store the capability category of the UE in the CELL_DCH state during state transition according to the resolution result, and acquire the locally stored capability category of the UE.

In the example of the second signaling in the control apparatus 10 according to the embodiment of the present invention, if the second signaling includes an RRC State Transition Indicator IE of the UE, the processing unit 202 is further configured to resolve s the IE to acquire a new H-RNTI assigned by the RNC to the UE, store a corresponding relation between the HS-DSCH physical layer category and the H-RNTI of the UE corresponding to a radio link.

Correspondingly, the transmitting unit 204 is configured to perform data transmission in the enhanced CELL_FACH state according to the capability category of the UE acquired by the acquisition unit.

The definitions of the HS-DSCH data frame and the NBAP signaling in the above devices are consistent with the definitions in the control apparatus 10 according to the embodiment of the present invention.

As described above, in the system according to the embodiment of the present invention, since the RNC explicitly or implicitly sends the indicator of the capability category of the UE to the Node B, when the UE is set to receive enhanced CELL_FACH data in the CELL_FACH state, the Node B performs TFRC selection on CCCH, DCCH, and DTCH data queues from the RNC based on the HS-DSCH physical layer category of the target UE, instead of the Category 12, thereby increasing the data transmission rate in the enhanced CELL_FACH state. In the technical solution of the embodiment of the flat architecture, a similar technical effect can be achieved by using the corresponding technical solution, which will not be described herein again.

The device embodiments described above are merely exemplary. Units described as separated components may be or may not be physically separated. Components shown as units may be or may not be physically separated or united units. That is, they may be integrated at a certain position or distributed to a plurality of network units. Some or all of the components may be selected to achieve the objective of the solution of the embodiments depending upon the actual demands Persons of ordinary skill in the art can understand and implement the present invention without making creative efforts.

Through the descriptions of the preceding embodiments, those skilled in the art may understand that the present invention may be implemented by hardware only or by software on a necessary universal hardware platform. Based on such understandings, all or part of the technical solution under the present invention may be embodied in the form of a computer program product. The computer program product may be stored in a non-transient medium which may be a Read-Only Memory (ROM), a Random Access Memory (RAM), a magnetic disk, or a Compact Disk Read-Only Memory (CD-ROM). The program includes a number of instructions that enable a computer device (personal computer, server, or network device) to execute the methods provided in the embodiments of the present invention.

The above descriptions are merely some exemplary embodiments of the present invention, and are intended to limit the scope of the present invention. Any modification, equivalent replacement, or improvement made according to the appended claims of the present invention should fall within the scope of the present invention.

What is claimed is:

1. A method for controlling data transmission in a radio communication network system, comprising:
   sending, by a radio network controller, information indicating a capability category of a terminal device to a radio transceiver; and
   performing, by the radio transceiver, data transmission in an enhanced cell forward access channel state according to the capability category of the terminal device received from the radio network controller.

2. The method according to claim 1, wherein the information indicating the capability category of the terminal device is contained in a high speed downlink shared channel (HS-DSCH) data frame.

3. The method according to claim 2, wherein an information element of the HS-DSCH data frame indicates the capability category of the terminal device.

4. The method according to claim 2, wherein the information indicating the capability category of the terminal device is contained in a HS-DSCH data frame TYPE2 data frame.

5. The method according to claim 4, wherein the capability category of the terminal device comprises a HS-DSCH physical layer category.

6. The method according to claim 1, wherein the capability category of the terminal device comprises a high speed downlink shared channel (HS-DSCH) physical layer category.

7. The method according to claim 1, wherein the radio communication network is a Universal Mobile Telecommunication System (UMTS), and the radio transceiver is a Node B.

8. The method according to claim 1, further comprising:
acquiring, by the radio transceiver, the capability category of the terminal device according to the information indicating the capability category of the terminal device received from the radio network controller.

9. A data transmission method in a radio communication network system, comprising:
receiving, by a radio transceiver, information indicating a capability category of a terminal device from a radio network controller; and
performing, by the radio transceiver, data transmission in an enhanced cell forward access channel state according to the capability category of the terminal device.

10. The method according to claim 9, wherein the information indicating the capability category of the terminal device is contained in a high speed downlink shared channel (HS-DSCH) data frame.

11. The method according to claim 10, wherein an information element of the HS-DSCH data frame indicates the capability category of the terminal device.

12. The method according to claim 10, wherein the information indicating the capability category of the terminal device is contained in a HS-DSCH data frame TYPE2 data frame.

13. The method according to claim 12, wherein the capability category of the terminal device comprises a HS-DSCH physical layer category.

14. The method according to claim 9, wherein the radio transceiver is a Node B.

15. A non-transitory computer-readable medium comprising instructions that, when executed, cause a radio transceiver to:
receive information indicating capability category of a terminal device from a radio network controller; and
perform data transmission in an enhanced cell forward access channel state according to the capability category of the terminal device.

16. The non-transitory computer-readable medium according to claim 15, wherein the information indicating the capability category of the terminal device is contained in a high speed downlink shared channel (HS-DSCH) data frame TYPE2 data frame.

17. The non-transitory computer-readable medium according to claim 15, wherein the capability category of the terminal device comprises a HS-DSCH physical layer category.

* * * * *